United States Patent
West

(10) Patent No.: US 11,327,904 B2
(45) Date of Patent: May 10, 2022

(54) SYSTEMS AND METHODS FOR SECURING PROTECTED ITEMS IN MEMORY

(71) Applicants: Denso International America, Inc., Southfield, MI (US); Denso Corporation, Aichi (JP)

(72) Inventor: David M. West, Clarkston, MI (US)

(73) Assignees: Denso International America, Inc., Southfield, MI (US); Denso Corporation, Aichi (JP)

(*) Notice: Subject to any disclaimer, the term of this patent is extended or adjusted under 35 U.S.C. 154(b) by 97 days.

(21) Appl. No.: 16/815,562

(22) Filed: Mar. 11, 2020

(65) Prior Publication Data

US 2021/0286736 A1 Sep. 16, 2021

(51) Int. Cl.
*G06F 12/14* (2006.01)

(52) U.S. Cl.
CPC .. *G06F 12/1425* (2013.01); *G06F 2212/1052* (2013.01)

(58) Field of Classification Search
CPC ......... G06F 12/1425; G06F 2212/1052; G06F 12/1408; G06F 2221/2127; G06F 12/1483; G06F 21/6218; G06F 12/0238
See application file for complete search history.

(56) References Cited

U.S. PATENT DOCUMENTS

| | | | |
|---|---|---|---|
| 5,978,273 A | 11/1999 | Shigemura | |
| 6,009,495 A | 12/1999 | DeRoo et al. | |
| 7,308,547 B2 | 12/2007 | Page et al. | |
| 7,596,695 B2 * | 9/2009 | Liao | G06F 21/6209 380/44 |
| 9,317,690 B2 | 4/2016 | Sallam | |
| 9,720,616 B2 | 8/2017 | Yu et al. | |
| 10,089,489 B2 * | 10/2018 | Goldfarb | G06F 16/285 |
| 2007/0192630 A1 * | 8/2007 | Crane | G06F 21/6245 713/193 |
| 2009/0164831 A1 | 6/2009 | Birru et al. | |
| 2014/0258599 A1 * | 9/2014 | Rostoker | G06F 12/0246 711/103 |
| 2019/0079575 A1 | 3/2019 | Hanson et al. | |

FOREIGN PATENT DOCUMENTS

| | | | | |
|---|---|---|---|---|
| CN | 101533451 A | * | 9/2009 | ............. G06F 21/82 |
| EP | 1984824 B1 | | 8/2007 | |

* cited by examiner

*Primary Examiner* — Reginald G Bragdon
*Assistant Examiner* — Sakhr A Aldaylam
(74) *Attorney, Agent, or Firm* — Christopher G. Darrow; Darrow Mustafa PC

(57) ABSTRACT

System, methods, and other embodiments described herein relate to improving security of protected values in a memory. In one embodiment, a method includes, in response to receiving a write request indicating at least an item and a write value to write into the memory, determining whether a protected items list (PIL) indicates that the item is protected. The method includes replacing the write value of the write request with a protected value from the PIL that corresponds with the item when the item is listed in the PIL as being protected. The method further includes executing the write request to the memory.

20 Claims, 4 Drawing Sheets

SYSTEMS AND METHODS FOR SECURING PROTECTED ITEMS IN MEMORY

TECHNICAL FIELD

The subject matter described herein relates in general to systems and methods for securing memory from unauthorized alteration, and, in particular, to intercepting write requests and swapping values in the write request when an associated item to be written is protected.

BACKGROUND

Electronic devices may include different types of memory for different purposes. For example, a device may include both volatile memory and non-volatile memory. While the device may use the volatile memory for instruction and data caching during operation, the device generally uses the non-volatile memory for longer-term storage of software, configuration data, and so on. In some instances, the configuration data may include pre-programmed default values that are to be written once and then remain unchanged. For example, the default values may indicate aspects for controlling the device, such as a user mode, region encoding, part number, product variation, or other aspects that are intended to remain constant once originally written by a manufacturing or other party that originally configures the device. By contrast, other configuration data may be selectively modifiable, such as data relating to user preferences, etc.

In general, the device stores the data in the non-volatile memory using write requests while reading the data using read requests. Various applications executing in the device may generate these read/write requests to the memory, which the device processes through a memory stack (e.g., lower-level software including memory drivers) to access the memory itself. Thus, while the applications may not permit direct alteration of the one-time programmed default values, a malicious user or malicious software may attempt to alter the values by, for example, independently generating write requests that modify the default values. This may be done to circumvent various regional protections or user modes and alter the operation of the device beyond what is intended. Accordingly, the default values may be vulnerable to unintended alterations.

SUMMARY

In one embodiment, example systems and methods associated with improving the security of protected values in memory from unauthorized alteration are disclosed. As previously noted, various configuration data stored in non-volatile memory (NVM) may be sensitive to alteration. That is, altering certain default values in the configuration data may alter the way in which an associated device functions, which is generally undesirable. Moreover, because a device may rely on programming heuristics (e.g., application program interfaces (APIs)) that are native to the software to protect the configuration data, the data can be vulnerable to attacks by malicious routines that circumvent the protections.

Therefore, in one embodiment, a sentinel system is disclosed that intercepts write requests within a memory stack to secure protected values in a memory. For example, the sentinel system intervenes within a flow for write requests between applications and the physical memory. In one or more approaches, the sentinel system includes one or more routines within the memory stack that function to intercept the write request before accessing the physical memory but after application layer handling, thereby avoiding difficulties with the protections being circumvented. As such, when the memory stack receives a write request, the sentinel system is able to initially analyze the request to determine whether the request is attempting to write values to items that are protected.

Accordingly, the sentinel system can, in one or more approaches, implement a list or another mechanism to identify items stored in the memory that are to be protected. For example, in one approach, the sentinel system implements a protected items list (PIL). The PIL, in one or more arrangements, includes a listing of protected items and default values for the items. The default values are values that are protected and intended to remain unchanged for the items in the configuration data. Thus, the sentinel system may store the PIL in an unmodifiable form (e.g., read-only memory (ROM)), and use the PIL as a reference against incoming write requests.

As such, when the sentinel system receives a write request, the sentinel system performs a search for the item in the PIL. If the item matches an item in the PIL, then the sentinel system replaces a write value of the write request with a protected value corresponding to the item in the PIL. Consequently, the sentinel system can then still execute the write request; however, the write request is automatically executed with the protected value, thereby avoiding alteration of the protected item. In this way, the sentinel system improves the security of the protected items in the memory by permitting the write request to execute but with the protected value from the PIL.

In one embodiment, a sentinel system for improving the security of protected values in a memory is disclosed. The sentinel system includes one or more processors and a memory that is communicably coupled to the one or more processors. The memory stores a security module including instructions that when executed by the one or more processors cause the one or more processors to, in response to receiving a write request indicating at least an item and a write value to write into the memory, determine whether a protected items list (PIL) indicates that the item is protected. The security module includes instructions to replace the write value of the write request with a protected value from the PIL that corresponds with the item when the item is listed in the PIL as being protected. The memory stores a request module including instructions that when executed by the one or more processors cause the one or more processors to execute the write request to the memory.

In one embodiment, a non-transitory computer-readable medium for improving the security of protected values in a memory is disclosed. The computer-readable medium stores instructions that, when executed by one or more processors, cause the one or more processors to perform the disclosed functions. The instructions include instructions to, in response to receiving a write request indicating at least an item and a write value to write into the memory, determine whether a protected items list (PIL) indicates that the item is protected. The instructions include instructions to replace the write value of the write request with a protected value from the PIL that corresponds with the item when the item is listed in the PIL as being protected. The instructions include instructions to execute the write request to the memory.

In one embodiment, a method of improving security of protected values in a memory is disclosed. The method includes, in response to receiving a write request indicating at least an item and a write value to write into the memory, determining whether a protected items list (PIL) indicates that the item is protected. The method includes replacing the write value of the write request with a protected value from the PIL that corresponds with the item when the item is listed in the PIL as being protected. The method further includes executing the write request to the memory.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Figure 1:
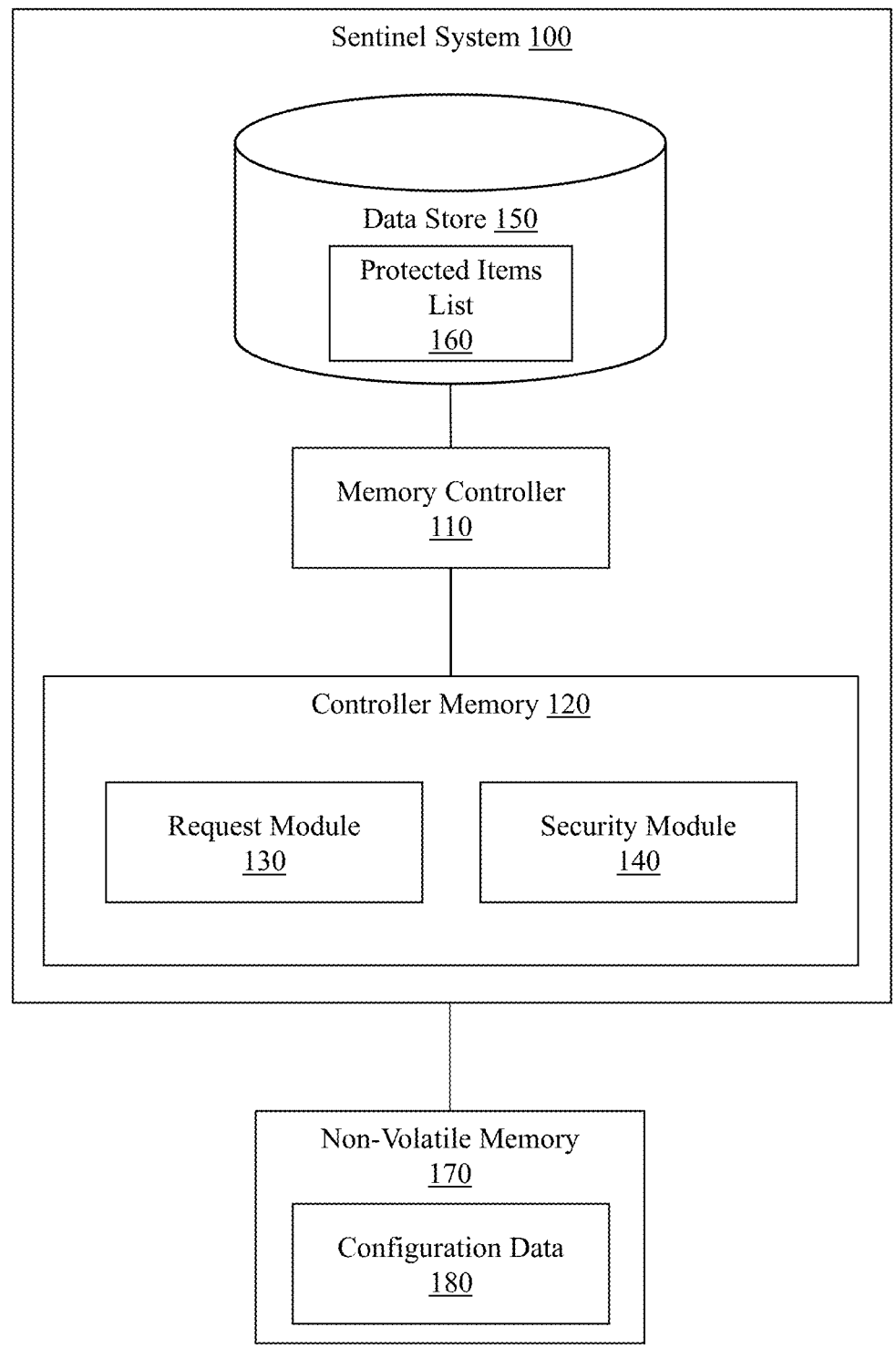
FIG. 1 illustrates one embodiment of a sentinel system that is associated with improving the security of a non-volatile memory against unauthorized modification of data elements.

Systems, methods, and other embodiments associated with improving the security of protected values in memory from unauthorized alterations are disclosed. As previously noted, various configuration data stored in non-volatile memory (NVM) may be sensitive to alteration. That is, altering certain default values in the configuration data may alter the way in which an associated device functions, which is generally undesirable. For example, altering an execution mode (e.g., user vs. manufacturer) or region code (e.g., North America vs. Europe) can change the way in which the device functions, thereby potentially violating local regulations and potentially interfering with other devices or causing other difficulties. Moreover, because a device may rely on programming heuristics, such as APIs to protect the configuration data at the application level, the configuration data can remain vulnerable to more sophisticated attacks that circumvent the APIs or otherwise avoid the built-in application-level protections in the device.

Therefore, in one embodiment, a sentinel system is disclosed that intercepts write requests within a memory stack to secure protected values in a memory. For example, the sentinel system intervenes within a flow for write requests between applications and the physical memory. In one or more approaches, the sentinel system includes one or more routines within the memory stack that function to intercept the write request before accessing the physical memory but after application-level handling. By intercepting the write requests within the memory stack instead of attempting to protect the items at the application level, the sentinel system can avoid difficulties with malicious attempts to circumvent the protections.

As such, when the memory stack receives a write request, the sentinel system is able to initially analyze the request to determine whether the request is attempting to write values to items that are protected. Accordingly, the sentinel system can, in one or more approaches, implement a list, table, or another data structure to store a record of which items are protected and protected values associated with the protected items. In general, the sentinel system uses the data structure as a trusted repository of protected items and corresponding values from which items to be written, as specified in write requests, can be compared. For example, in one approach, the sentinel system implements a protected items list (PIL). The PIL, in one or more arrangements, includes a listing of protected items and default values corresponding to the protected items. The default values are values that are protected and intended to remain unchanged for the protected items. Thus, the sentinel system may store the PIL in an unmodifiable form (e.g., read-only memory (ROM)) to ensure the PIL is secure, while using the PIL as a reference against incoming write requests.

As such, the sentinel system performs a search on incoming write requests for the item in the PIL. If the item matches an item in the PIL, then the sentinel system replaces a write value of the write request with a protected value corresponding to the item in the PIL. Consequently, the sentinel system does not block or otherwise prevent the write request, but instead executes the write request with the protected value swapped for the write value. Therefore, the sentinel system avoids alteration of the protected item and improves the security of the protected items in the memory by permitting the write request to execute but with the protected value from the PIL.

Referring to FIG. 1, one embodiment of a sentinel system 100 is illustrated. While arrangements will be described herein with respect to the sentinel system 100, it will be understood that embodiments are not limited to a unitary system, as illustrated. In some implementations, the sentinel system 100 may be embodied as multiple separate components distributed within a single device. Moreover, the sentinel system 100, in one or more arrangements, may be embodied within a single chip/die as part of an integrated circuit package, may be integrated as multiple separate components on a printed circuit board, or may be provided in another configuration. In any case, the sentinel system 100 is illustrated and discussed as a single device for purposes of discussion; however, the illustrated form should not be construed as limiting the overall possible configurations in which the disclosed aspects may be configured. For example, the separate modules, memories, data stores, controllers, and so on may be distributed among various computing components in varying combinations. As one example, the sentinel system 100 may be integrated with a memory (e.g., a non-volatile memory 170) as part of a controller for the particular memory.

The sentinel system 100 also includes various elements. It will be understood that, in various embodiments, it may not be necessary for the sentinel system 100 to have all of the elements shown in FIG. 1. The sentinel system 100 can have any combination of the various elements shown in FIG. 1. Further, the sentinel system 100 can include additional elements to those shown in FIG. 1. While the various elements are shown as being located within the sentinel system 100 in FIG. 1, it will be understood that one or more of these elements can be located external to the sentinel system 100. Further, the elements shown may be physically separated by large distances.

Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements.

In any case, the sentinel system 100 is implemented to perform methods and other functions as disclosed herein relating to improving the security of items within a memory. The noted functions and methods will become more apparent with a further discussion of the figures. Furthermore, the sentinel system 100 is shown as including a memory controller 110. Thus, in various implementations, the memory controller 110 may be a part of the sentinel system 100, the sentinel system 100 may access the memory controller 110 through a data bus or another communication pathway. In either case, the memory controller 110 is an electronic device such as a microprocessor, an application-specific integrated circuit (ASIC), a microcontroller, or another processing component that is capable of executing machine-readable instructions to produce various electronic outputs therefrom that may be used to control or cause the control of other electronic devices, such as in support of controlling memory read/write requests.

In one embodiment, the sentinel system 100 includes a controller memory 120 that stores a request module 130 and a security module 140. The controller memory 120 is a random-access memory (RAM), read-only memory (ROM), a hard-disk drive, a flash memory, a cache memory, or another suitable memory for storing the modules 130, and 140. The modules 130, and 140 are, for example, computer-readable instructions that, when executed by the memory controller 110, cause the memory controller 110 to perform the various functions disclosed herein. In various embodiments, the modules 130 and 140 can be implemented in different forms that can include but are not limited to hardware logic, an ASIC, components of the memory controller 110, instructions embedded within an electronic memory, and so on.

With continued reference to the sentinel system 100, in one embodiment, the sentinel system 100 includes a data store 150. The data store 150 is, in one embodiment, an electronic data structure stored in a local memory of the sentinel system 100, such as the controller memory 120, or another electronic storage medium and that may be configured with routines that can be executed by the memory controller 110 for analyzing stored data, providing stored data, querying/searching stored data, organizing stored data, and so on. Thus, in one embodiment, the data store 150 stores data used by the modules 130 and 140 in executing various determinations. In one embodiment, the data store 150 stores the protected items list (PIL) 160. In further embodiments, the sentinel system 100 stores the PIL 160 in a read-only memory that is integrated with the memory controller 110 or another suitable data storage component that does not permit modification of the PIL 160.

The PIL 160 is, in one embodiment, a lookup table (LUT), a list, a set of registers, or another structure that is capable of storing pairs of item/value combinations. Accordingly, the PIL 160 includes, in one approach, a first column specifying "items" and a second column specifying "protected values" for the items. Thus, the item column specifies identifiers/names for different aspects of configuration data 180 that are to be protected within the non-volatile memory 170. In further aspects, the PIL 160 may specify data stored in the memory 170 beyond the configuration data 180. However, for purposes of brevity, this discussion will focus on the configuration data 180.

In various arrangements, the identifier within the item column of the PIL 160 is an alphanumeric variable name, such as "Mode," "Market," or another aspect included in the configuration data 180. In further aspects, the item column indicates a memory address and size of the item that is to be protected. Further, the protected value is a data value for the item as originally programmed by the manufacturer or another trusted party within the PIL 160. Thus, the protected value for a respective item in the PIL 160 represents a value that is intended to remain unmodified and secured.

Furthermore, as discussed herein, the noted modules 130 and 140 may function as part of a memory stack for accessing the non-volatile memory 170. That is, the request module 130 and the security module 140 form at least a portion of the memory stack to control access to the non-volatile memory 170 and secure the configuration data 180. As an additional point, the non-volatile memory 170 is, in general, a memory that retains stored information when power is cycled or otherwise removed from the memory 170. In particular, in one or more arrangements, the non-volatile memory 170 is a NAND flash, a solid-state drive (SSD), an EPROM, an EEPROM, a hard-disk drive (HDD), or another similar non-volatile memory. The foregoing list is provided as a listing of examples for purposes of discussion and should not be construed as a comprehensive listing of types of memory that may be used for the non-volatile memory 170.

Accordingly, the memory stack represents, in one embodiment, a group of procedural calls (also referred to as subroutines) that conform to a particular protocol for accessing the memory 170. Thus, the memory stack may be loaded into an active memory (e.g., a cache memory) of the memory controller 110 or another associated processor (e.g., a central processing unit (CPU)) for providing access to the memory 170 for higher-level processes, such as applications executing on the CPU.

Continuing with FIG. 1, the request module 130, in one embodiment, includes computer-readable instructions that, when executed by a processor (e.g., the memory controller 110), cause the processor to handle requests to the memory 170. For example, in one aspect, the request module 130 resides in the memory stack and functions to intercept write requests to the memory 170. Thus, in general, the request module 130 functions to at least receive the write requests via an inherent aspect of placement in the memory stack prior to the write request being processed to modify the memory 170. In this way, the request module 130 functions to intercept or, stated otherwise, redirect the write request from a standard pathway in the memory stack and into the security module 140. It should be appreciated that the write request itself is generally produced by an originating application that is executing in a system in which the non-volatile memory 170 is present. Of course, in instances where the write request represents a malicious attempt to modify the configuration data 180, the write request may originate from an outside source and be injected into the noted system or may be the product of malicious alterations to the application.

In any case, the security module 140, in one embodiment, includes computer-readable instructions that, when executed by a processor (e.g., the memory controller 110), cause the processor to perform one or more functions in support of protecting the configuration data 180 in the memory 170. In one approach, the security module 140 acquires the write request upon the request module 130 receiving the request in the memory stack and handing the write request over to the security module 140. The security module 140 determines whether the write request specifies an item that is on the PIL 160.

To determine the presence of an item on the PIL 160, the security module 140, in one approach, decodes the write request or otherwise extracts information from the write request that indicates the item. For example, the write request is generally formed according to a particular protocol or other defined formatting. Thus, the security module 140 may extract a particular field of the write request that correlates with the identifier of the item. The security module 140 may then use the identifier to query the PIL 160. In one approach, the security module 140 provides the identifier to the PIL 160 and receives a result indicating whether or not the item is present in the table. In a further approach, the security module 140 may directly compare the identifier for the item against separate entries in the PIL 160 to determine whether the item is present.

In any case, the security module 140 uses the PIL 160 to determine whether the write request is attempting to modify a protected item in the memory 170. If so, then the security module 140 replaces the write value of the write request with a protected value from the PIL 160 that corresponds with the item. Thus, the PIL 160 may directly return the protected value as part of the query when the item is present in the PIL 160 in contrast to returning a null value or another indicator specifying that the item is not in the list. The security module 140 can then substitute the protected value for the write value in the write request. In one approach, replacing the write value includes overwriting a memory location associated with the write value using the protected value. The memory location is, for example, a register or another working memory location (e.g., cache, RAM, etc.) that is used to convey the write request to the memory stack. In any case, the original value in the write request that is potentially attempting to alter the item is replaced by the protected value from the PIL 160.

The request module 130, after the security module 140 determines whether the item is present in the PIL 160 and selectively replaces the write value according to the presence of the item, then executes the write request. Thus, the request module 130 may re-write the protected value to the memory 170 in the instance that the write request is attempting to modify a protected item or otherwise simply executes the write request as originally intended when the item is not protected. In this way, the sentinel system 100 functions to improve the security of protected elements of the configuration data 180 while still fulfilling the actual write request and avoiding difficulties with circumventing protections.

Figure 2:
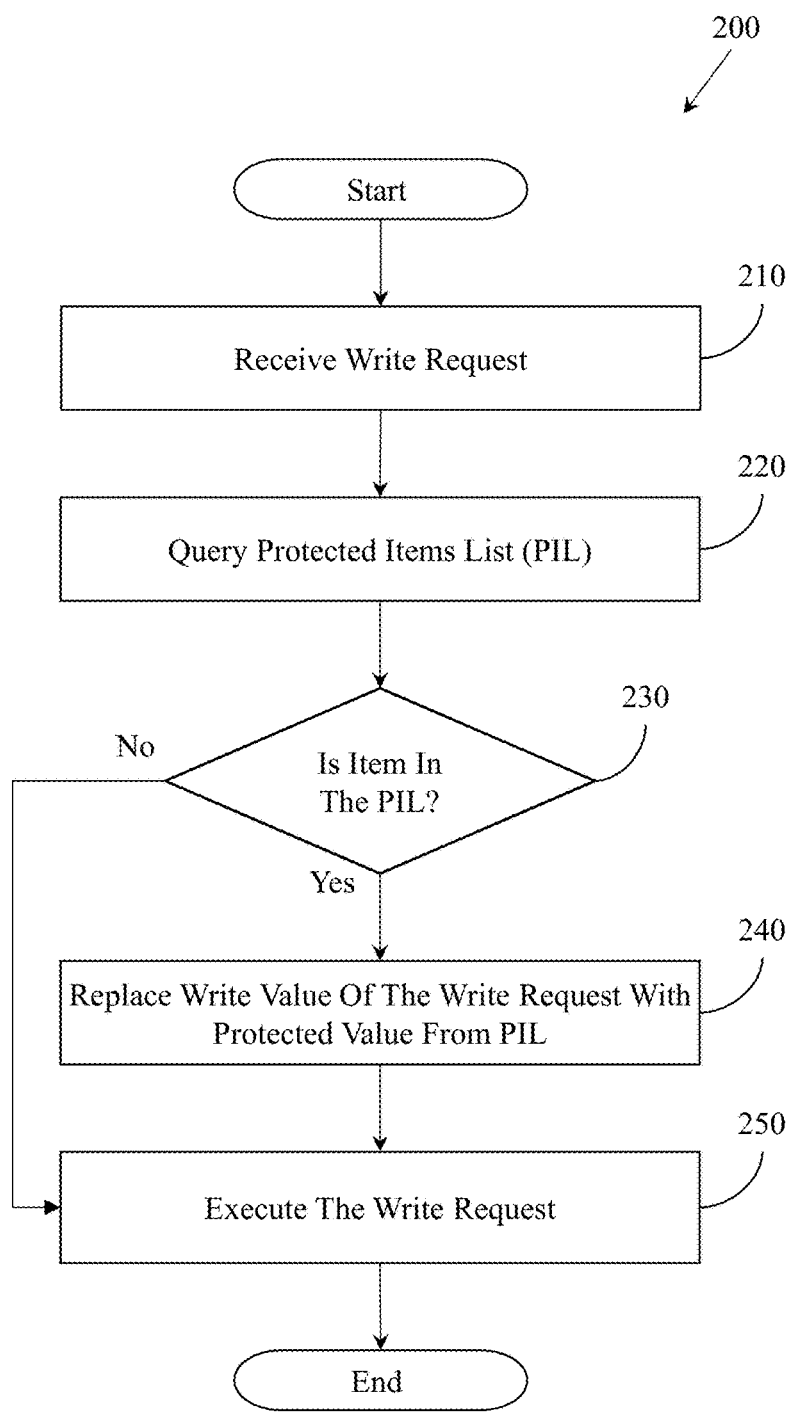
FIG. 2 illustrates one embodiment of a method associated with replacing write values in write requests that are directed to items in a protected items list (PIL).

Additional aspects of improving security for protected items in memory will be discussed in relation to FIG. 2. FIG. 2 illustrates a method 200 associated with intercepting write requests to a protected memory to prevent unauthorized write requests of protected configuration data. Method 200 will be discussed from the perspective of the sentinel system 100 of FIG. 1. While method 200 is discussed in combination with the sentinel system 100, it should be appreciated that the method 200 is not limited to being implemented within the sentinel system 100 but is instead one example of a system that may implement the method 200.

At 210, the request module 130 receives a write request. In one embodiment, the request module 130 at least semi-continuously monitors for write requests to the memory 170. For example, the request module 130 may execute as a process on the memory controller 110 to recognize write requests and induce handling of the write request as set forth herein. In further aspects, the request module 130 is a subroutine in the memory stack that is called via an API or another procedural request to access the memory for a write operation. In any case, at 210, the sentinel system 100 receives the write request including a write value to write into the memory 170 associated with a particular item in the memory 170, which may or may not be protected. As previously noted, the write request itself may have various formats according to the particular implementation but generally includes at least an identifier of the item and a write value for the item. As an additional point, the identifier of the item may include an identifier that is alphanumeric, a memory address (e.g., a pointer and value size), or another suitable format for identifying the particular item in the memory 170.

Figure 3:
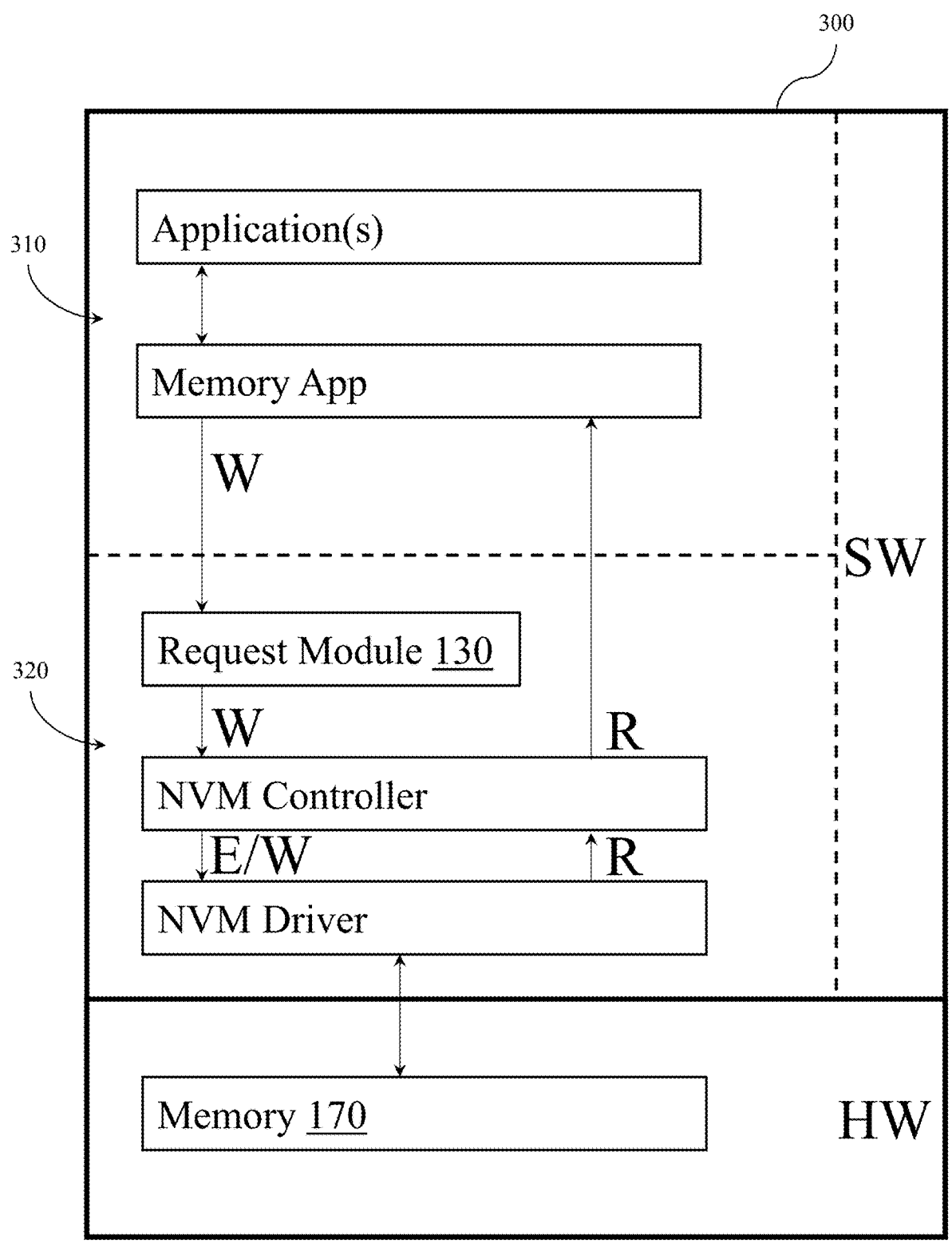
FIG. 3 illustrates a block diagram depicting an execution environment that includes a memory stack.

As a further explanation of the memory stack and how the sentinel system 100 receives the write request, briefly consider FIG. 3. FIG. 3 is a block diagram representing an execution environment 300 in relation to the memory 170. In FIG. 3, the notation "W" indicates a write request, "E/W" indicates an erase/write request, and "R" indicates a read operation/request. The environment 300 is divided into two primary sections labeled "SW" for software and "HW" for hardware. The noted labels of SW and HW generally correspond with separate layers in the environment 300 associated primarily with software or hardware. That is, the SW section is representing separate routines or groups of routines that may be executing on a processor, controller, or another associated device. By contrast, the HW section is representing aspects directly related to hardware elements, which in FIG. 3 corresponds with the memory 170.

Moreover, section 310 includes applications, while section 320 is the noted memory stack. The applications noted in the section 310 generally execute within a device that includes the memory 170 or in a device that is at least in communication with the memory 170 to perform read and write operations. The applications of the section 310 generally function to provide read and write requests to the memory 170 freely without knowledge of a type of the memory 170 or the intervening elements of the memory stack in section 320. Additionally, FIG. 3 further represents a memory application within section 310 that is, for example, a functional block for formatting requests from the applications and providing the requests into the memory stack.

As shown in FIG. 3, at least the request module 130 of the sentinel system 100 is integrated into section 320 with the memory stack. Moreover, as represented in FIG. 3, the request module 130 is integrated within a path for write requests while read requests pass directly to subsequent elements of the memory stack. In any case, the request module 130 is situated in the memory stack to intercept the write requests and provide the write requests to the security module 140 for further processing, including replacement of a value in the write request, if necessary.

Consequently, the request module 130 can then further provide write requests screened by the security module 140 back into the memory stack for execution in the memory 170. As further illustrated in FIG. 3, the request module 130, in one configuration, provides the write request to a non-volatile memory (NVM) controller in the memory stack that functions to perform various tasks for the memory 170, such as handling object redundancy, erase/write/read state machines, status monitoring, and so on. The requests then pass to the NVM driver for low-level handling directly with the hardware of the memory 170.

Continuing with FIG. 2, at 220, the security module 140 determines whether an item from the write request is on the PIL 160 by querying the PIL 160. In one embodiment, as previously specified, the process of querying the PIL 160 includes providing the identifier of the item to the PIL 160. Thus, the PIL 160 itself may include logic that supports a lookup operation. Alternatively, the security module 140 may include the noted logic and perform the lookup directly. In either case, the PIL 160 provides for determining whether the item of the write request is protected according to entries included therein.

Figure 4:
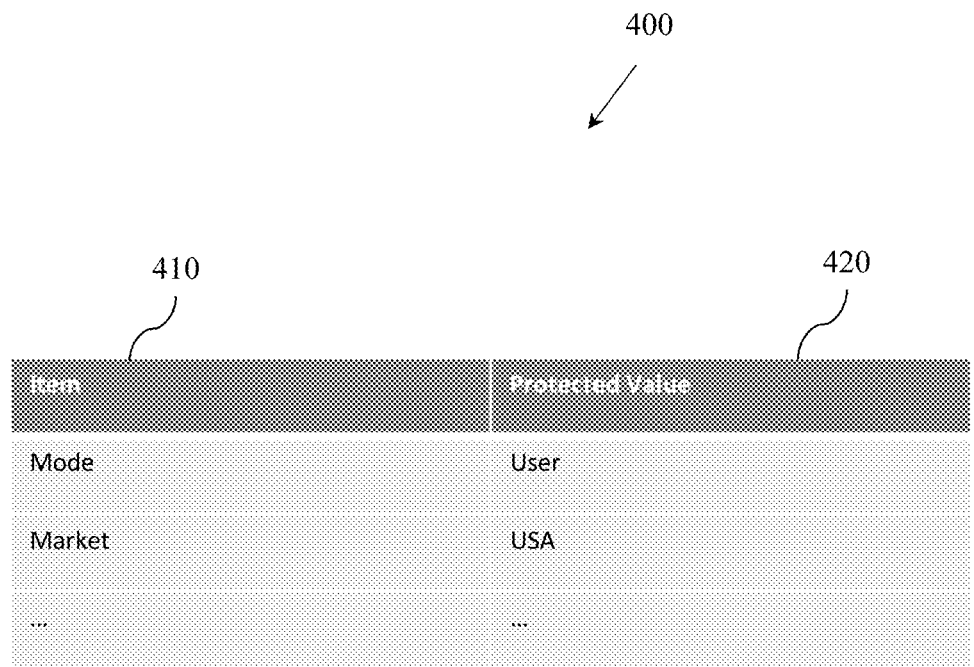
FIG. 4 illustrates one example of a protected items list (PIL).

As one example of the PIL 160, briefly consider FIG. 4. FIG. 4 illustrates a table 400 that is an example of the PIL 160. As shown in FIG. 4, the table 400 includes two separate columns, an item column 410 and a protected value column 420. Accordingly, the table 400 includes two separate entries of protected items in the illustrated example. For example, the table 400 includes separate items of "Mode" and "Market." As such, the identifiers for the items are alphanumeric values that further have protected values of a same type. The mode item has a protected value of "User," while the market item has a protected value of "USA." It should be appreciated that the protected values may be preconfigured to different values depending on programming by a manufacturer or other authorized source. For example, the mode item may include further preset value options of manufacturing, testing, and so on. The market item may include preset options of different regions and/or individual countries, such as Mexico, Europe, etc. For the noted elements of the configuration data 180, modifying the values to different values can, for example, change how an associated device functions.

For example, in the instance of an automotive system, such as an instrument cluster, altering the values may change a language, units of measurement, configurations of display elements, and so on. In other examples, such as an MP3 player, or another personal electronic device, modifying the values may change regional encoding standards that the device implements or other aspects. Thus, depending on the particular device and the protected values, unauthorized modification can have a significant effect on the functioning of the device, and is, therefore, generally undesirable. It should be further appreciated that to ensure the authenticity of the PIL 160, the sentinel system 100 stores the PIL 160 in a protected memory, such as a ROM, that is generally unalterable.

In any case, further continuing with FIG. 2, at 230, the security module 140 determines a result of querying the PIL 160 and either proceeds with replacing the write value of the write request at 240 or simply executes the write request, at 250, if the item in the write request is not protected.

At 240, the security module 140 replaces the write value of the write request with a protected value from the PIL 160. In one aspect, the protected value is returned as part of querying the PIL 160 and, as previously noted, corresponds with the item as a tuple pair in the PIL 160. Thus, the security module 140 thereby substitutes the protected value for whatever value was originally provided with the write request when the item is identified in the PIL 160. In this way, the sentinel system 100 functions to protect the value in the memory 170.

At 250, the request module 130 executes the write request to the memory 170. Executing the write request to the memory 170 functions to erase any existing value and write the value from the write request into the memory 170. Thus, whether the security module 140 modified the write request or not, the write request is still executed against the memory 170. Accordingly, by ensuring that any write request that indicates a protected item in the PIL 160 is using the protected value from the PIL 160, the write request cannot alter the value in the memory 170 but simply functions to re-write the same value back to the memory 170. Accordingly, the sentinel system 100 and associated methods generally function to improve the security of the configuration data 180 and/or other data listed in the PIL 160 through the use of a novel supervisory process injected into the memory stack of the non-volatile memory 170.

Additionally, it should be appreciated that the sentinel system 100 from FIG. 1 can be configured in various arrangements with separate integrated circuits and/or chips. In such embodiments, the request module 130 from FIG. 1 is embodied as a separate integrated circuit. Additionally, the security module 140 is embodied on an individual integrated circuit. The circuits are connected via connection paths to provide for communicating signals between the separate circuits. Of course, while separate integrated circuits are discussed, in various embodiments, the circuits may be integrated into a common integrated circuit board. Additionally, the integrated circuits may be combined into fewer integrated circuits or divided into more integrated circuits. In another embodiment, the modules 130, and 140 may be combined into a separate application-specific integrated circuit. In further embodiments, portions of the functionality associated with the modules 130, and 140 may be embodied as firmware executable by a processor and stored in a non-transitory memory. In still further embodiments, the modules 130, and 140 are integrated as hardware components of the memory controller 110.

In another embodiment, the described methods and/or their equivalents may be implemented with computer-executable instructions. Thus, in one embodiment, a non-transitory computer-readable medium is configured with stored computer-executable instructions that, when executed by a machine (e.g., processor, controller, and so on) cause the machine (and/or associated components), perform the method.

While for purposes of simplicity of explanation, the illustrated methodologies in the figures are shown and described as a series of blocks, it is to be appreciated that the methodologies are not limited by the order of the blocks, as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional blocks that are not illustrated.

The sentinel system 100 can include one or more memory controller(s) 110. In one or more arrangements, as previously indicated, the memory controller 110 can be an electronic control unit (ECU). The sentinel system 100 can include one or more data stores for storing one or more types of data. The data stores can include volatile and/or non-volatile memory. Examples of suitable data stores include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, distributed memories, cloud-based memories, other storage medium that are suitable for storing the disclosed data, or any combination thereof. The data stores can be a component of the memory controller 110, or the data store can be operatively connected to the memory controller processor 110 for use thereby. The term "operatively connected," as used throughout this description, can include direct or indirect connections, including connections without direct physical contact.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-4, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one system or in a distributed fashion where different elements are spread across several interconnected systems. A combination of hardware and software can be a system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Examples of such a computer-readable medium may include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device can read. In the context of this document, a computer-readable storage medium may be any tangible medium that can contain, or store a program for use by or in connection with an instruction execution system, apparatus, or device.

The following includes definitions of selected terms employed herein. The definitions include various examples and/or forms of components that fall within the scope of a term, and that may be used for various implementations. The examples are not intended to be limiting. Both singular and plural forms of terms may be within the definitions.

References to "one embodiment," "an embodiment," "one example," "an example," "an arrangement," "one arrangement," "one aspect," and so on, indicate that the embodiment(s), example(s), arrangement(s), aspect(s), and so on so described may include a particular feature, structure, characteristic, property, element, or limitation, but that not every embodiment, example, arrangement, or aspect, necessarily includes that particular feature, structure, characteristic, property, element or limitation. Furthermore, repeated use of the phrase "in one embodiment" does not necessarily refer to the same embodiment, though it may.

"Module," as used herein, includes a computer or electrical hardware component(s), firmware, a non-transitory computer-readable medium that stores instructions, and/or combinations of these components configured to perform a function(s) or an action(s), and/or to cause a function or action from another logic, method, and/or system. Module may include a microprocessor controlled by an algorithm, a discrete logic (e.g., ASIC), an analog circuit, a digital circuit, a programmed logic device, a memory device including instructions that when executed perform an algorithm, and so on. A module, in one or more embodiments, includes one or more CMOS gates, combinations of gates, or other circuit components. Where multiple modules are described, one or more embodiments include incorporating the multiple modules into one physical module component. Similarly, where a single module is described, one or more embodiments distribute the single module between multiple physical components.

Additionally, module, as used herein, includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC, or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A sentinel system for improving security of protected values in a memory, comprising:
   one or more processors;
   a memory communicably coupled to the one or more processors and storing:
   a security module including instructions that when executed by the one or more processors cause the one or more processors to, in response to receiving a write request indicating at least an item and a write value to write into the memory, determine whether a protected items list (PIL) indicates that the item is protected, and replace the write value of the write request with a protected value from the PIL that corresponds with the item when the item is listed in the PIL as being protected, the protected value being an actual value of the item in the memory, wherein the PIL is stored in a read-only memory (ROM) separate from the item; and
   a request module including instructions that when executed by the one or more processors cause the one or more processors to execute the write request to the memory.

2. The sentinel system of claim 1, wherein the security module includes instructions to replace the write value including instructions to substitute the protected value from the PIL for the write value in the write request to protect the item in the memory from alteration while permitting the write request to proceed.

3. The sentinel system of claim 1, wherein the security module includes instructions to determine whether the PIL includes the item including instructions to query the PIL according to an identifier of the item to identify whether the PIL includes an entry corresponding to the item.

4. The sentinel system of claim 3, wherein the security module includes instructions to query the PIL including instructions to use the identifier as an input to a lookup table that stores the PIL, and wherein the PIL is read-only.

5. The sentinel system of claim 1, wherein the security module includes instructions to determine whether the PIL includes the item including instructions to determine whether a memory address from the write request corresponds with a protected address range specified by the PIL.

6. The sentinel system of claim 1, wherein the request module includes instructions to receive the write request including instructions to redirect the write request into the security module for supervising write requests according to permissions associated with the write requests.

7. The sentinel system of claim 1, wherein the write request is a request to the memory that is a non-volatile memory that is handled by a memory stack.

8. The sentinel system of claim 1, wherein the one or more processors include a memory controller for controlling the memory.

9. A non-transitory computer-readable medium storing instructions for improving security of protected values in a memory and that when executed by one or more processors cause the one or more processors to:
   in response to receiving a write request indicating at least an item and a write value to write into the memory, determine whether a protected items list (PIL) indicates that the item is protected;
   replace the write value of the write request with a protected value from the PIL that corresponds with the item when the item is listed in the PIL as being protected, the protected value being an actual value of the item in the memory, wherein the PIL is stored in a read-only memory (ROM) separate from the item; and
   execute the write request to the memory.

10. The non-transitory computer-readable medium of claim 9, wherein the instructions to replace the write value include instructions to substitute the protected value from the PIL for the write value in the write request to protect the item in the memory from alteration while permitting the write request to proceed.

11. The non-transitory computer-readable medium of claim 9, wherein the instructions to determine whether the PIL includes the item include instructions to query the PIL according to an identifier of the item to identify whether the PIL includes an entry corresponding to the item.

12. The non-transitory computer-readable medium of claim 11, wherein the instructions to query the PIL include instructions to use the identifier as an input to a lookup table that stores the PIL, and wherein the PIL is read-only.

13. The non-transitory computer-readable medium of claim 9, wherein the instructions to receive the write request include instructions to redirect the write request into a security module for supervising write requests according to permissions associated with the write requests.

14. A method of improving security of protected values in a memory, comprising:
   in response to receiving a write request indicating at least an item and a write value to write into the memory, determining whether a protected items list (PIL) indicates that the item is protected;
   replacing the write value of the write request with a protected value from the PIL that corresponds with the item when the item is listed in the PIL as being protected, the protected value being an actual value of the item in the memory, wherein the PIL is stored in a read-only memory (ROM) separate from the item; and
   executing the write request to the memory.

15. The method of claim 14, wherein replacing the write value includes substituting the protected value from the PIL for the write value in the write request to protect the item in the memory from alteration while permitting the write request to proceed.

16. The method of claim 14, wherein determining whether the PIL includes the item includes querying the PIL according to an identifier of the item to identify whether the PIL includes an entry corresponding to the item.

17. The method of claim 16, wherein querying the PIL includes using the identifier as an input to a lookup table that stores the PIL, and wherein the PIL is read-only.

18. The method of claim 14, wherein determining whether the PIL includes the item includes determining whether a memory address from the write request corresponds with a protected address range specified by the PIL.

19. The method of claim 14, wherein receiving the write request includes redirecting the write request into a security module for supervising write requests according to permissions associated with the write requests.

20. The method of claim 14, wherein the write request is a request to the memory that is a non-volatile memory that is handled by a memory stack.

* * * * *